Sept. 20, 1955    G. H. KRAWINKEL    2,718,610
ACCELERATION INDICATING SYSTEM
Filed Feb. 1, 1951    2 Sheets-Sheet 1
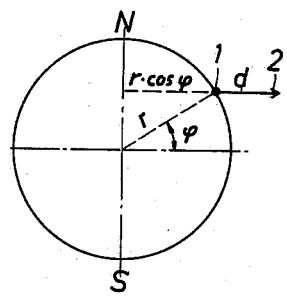
Fig.1
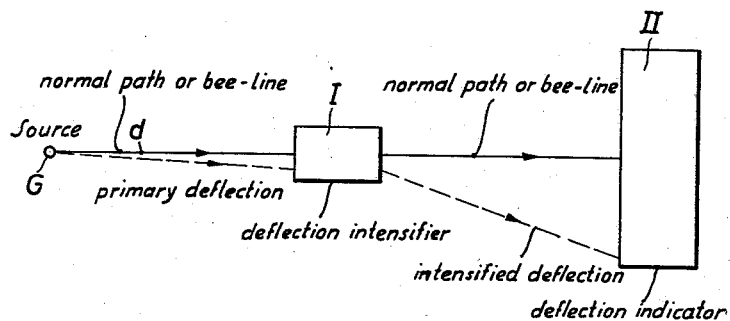
Fig.2
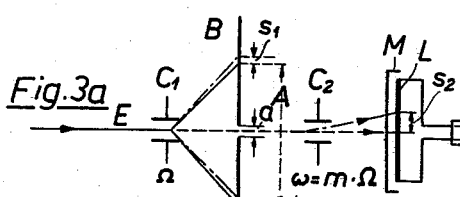
Fig.3a
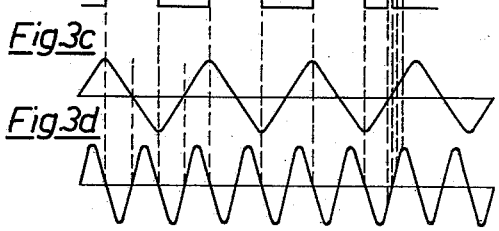
Fig.3b
Fig.3c
Fig.3d
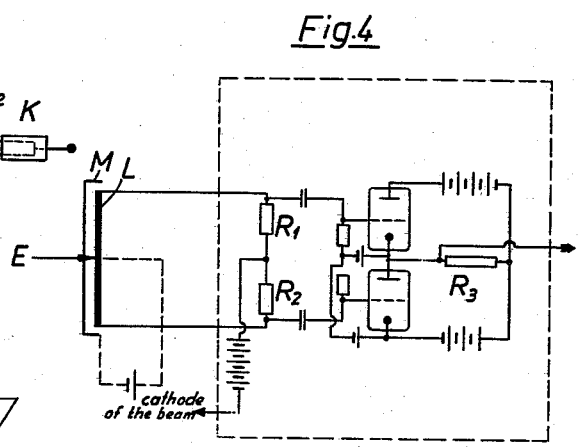
Fig.4
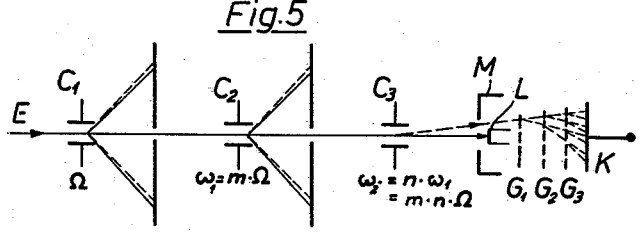
Fig.5
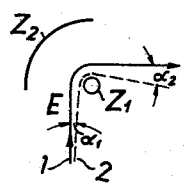
Fig.6
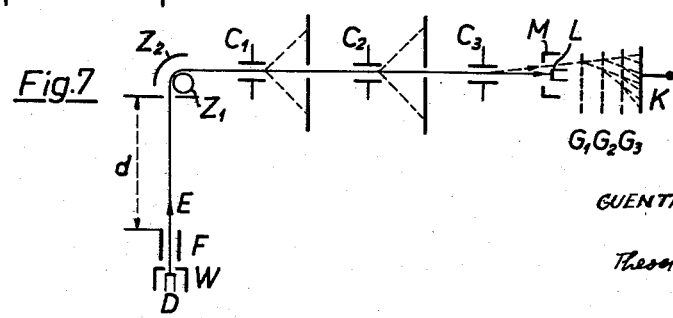
Fig.7
GUENTHER H. KRAWINKEL
INVENTOR
ATTORNEY Sept. 20, 1955  G. H. KRAWINKEL  2,718,610
ACCELERATION INDICATING SYSTEM
Filed Feb. 1, 1951  2 Sheets-Sheet 2
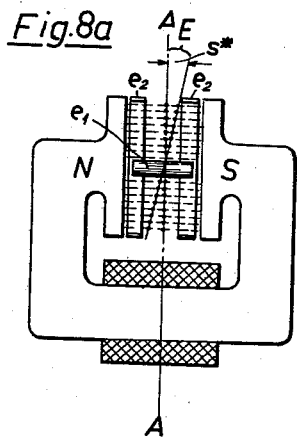
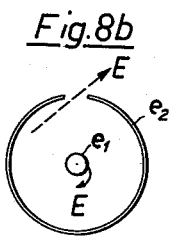
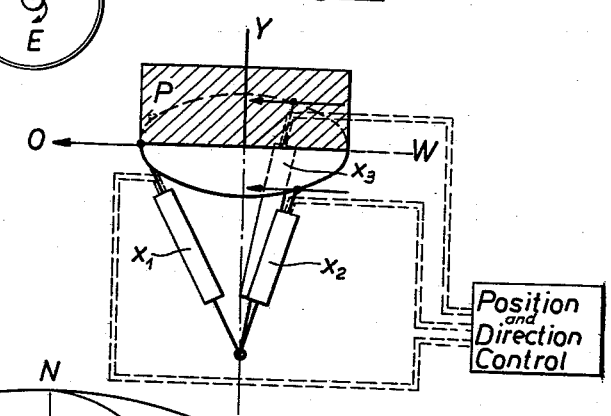
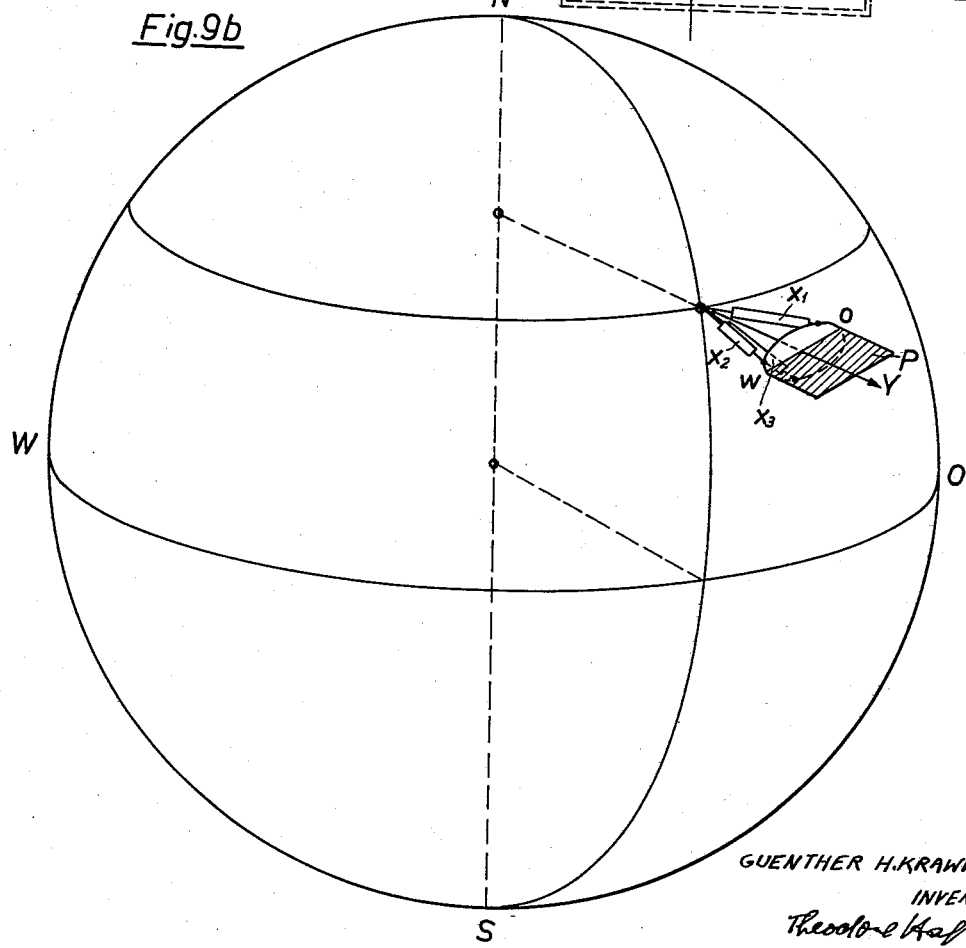
GUENTHER H. KRAWINKEL
INVENTOR
ATTORNEY

United States Patent Office 2,718,610
Patented Sept. 20, 1955

2,718,610
ACCELERATION INDICATING SYSTEM

Guenther H. Krawinkel, Frankfurt (Main), Germany

Application February 1, 1951, Serial No. 208,963

4 Claims. (Cl. 315—17)

This invention relates to the indication of the acceleration of moved bodies. Especially it describes a method for measuring the acceleration of linearly moved bodies and/or the angle-velocity of rotating bodies.

It is the basis of this invention that electron-rays, or ion-rays or rays which means of electrically charged mass-particles which originate from any type of cathode in an evacuated bulb, and which in a free flight arrive at another defined point of the tube-system, suffer during their flight time between their point of origin and their point of arrival within the tube-system, a flight-path-deviation from the normal path in consequence of an accelerated movement of the bulb with its included tube-system. That is a flight-path-deviation which does not occur in an unaccelerated condition of the device, so that it is possible to indicate an acceleration of the tube-system by the aforementioned flight-path-deviation.

Such electronic metering devices for accelerated movements have the principal advantage, compared with the well known acceleration indicators, that even in the case of an incidentally happening change of the electrical voltages of the tube-system the indicated direction of maximum-acceleration of the movement to be analysed remains absolutely fixed. Therefore, the device delivers an absolute direction-definition independent of the time. As it is possible to fix the limits of possible electrical tension-changes within the tube-system, a well defined measurement-exactness, can be ascertained, independent of the time.

Without limiting the application of this invention of acceleration indication to a special case, the description further on will describe a performance of the acceleration indicating system based on the movement of a rotating body.

According to the invention, the device for direction-indication and/or for producing a fixed plane in respect to the body's axis uses the phenomenon that in two points with different distances from the body's axis, different tangential velocities exist in consequence of the body's rotation. The angle-velocity of the rotation in these two points, of course, is the same. But, a ray of electrically charged particles or waves not subjugated to outer field influences through its free flight-path between the points of origin and arrival, seems to have a deviation from the bee-line propagation if the points of original and arrival have different distances from the body axis. Tihs deviation from the bee-line propagation or normal path occurs in consequence of the different tangential velocities in the two points concerned. The magnitude of this deviation depends upon the site, that means upon the distances of the rays' points of origin and arrival from the axis.

The novel features, which I believe to be characteristic of my invention are set forth with particularity in the appended claims, but the invention itself will best be understood by reference to the following description taken in connection with the accompanying drawing, in which:

Fig. 1 is a purely schematic section of the rotating body along the axis N–S and being helpful in understanding the principal of my invention, Fig. 2 is another schematic diagram showing in a general form the principle underlying all performances of my invention and showing especially the two important elements of my invention, namely a "deflection intensifier" and a "deflection indicator" to be described with more particularity later on, Fig. 3a is one performance of my invention, Figs. 3a, 3b, 3c, 3d are waveforms being helpful in explaining the functions of the various elements of the performance in Fig. 3a, Fig. 4 is a more detailed view of the deflection indicator contained in Fig. 3a, Fig. 5 is another performance of my invention, working on the same principal as to the deflection intensifier unit compared with Fig. 3a, but employing a multiplier device as a deflection indicator, Fig. 6 shows another performance of a deflection intensifier which may be used additionally to the intensifier unit shown in Fig. 3a.

Fig. 7 shows a performance of the invention containing an intensifier according to Fig. 6 and as to its other elements corresponds essentially with Fig. 5, Figs. 8a, 8b show a device, wherein the time of travelling of electrons is by special means enlarged or magnified as compared with Fig. 2, so as to result in a deflection of such magnitude as will be easily indicated, Fig. 9a shows a combination of three acceleration indicating systems as shown in the foregoing figures, these systems being combined in such manner that the W–O direction and a plane may be defined by the instrument, as is explained later on in describing this figure, Fig. 9b shows how the combination shown in Fig. 9a will be orientated with respect to the rotating body.

The angle-velocity of the body's rotation around its axis may be measured in arc-grades per second. Consequently, the tangential velocities in the points 1 and 2 of Fig. 1, showing a cut through the body along a meridian plane, are $$v_1 = r^{[cm.]} \cdot \cos \varphi \cdot \omega^* \left[\frac{cm.}{sec.}\right]$$

$$v_2 = (r^{[cm.]} \cdot \cos \varphi + d^{[cm.]}) \cdot \omega^* \left[\frac{cm.}{sec.}\right]$$

if $d$ is the distance of points 1 and 2 measured in cm. The difference $\Delta v$ of these two velocities has the value $$\Delta v = v_2 - v_1 = d \cdot \omega^* \left[\frac{cm.}{sec.}\right]$$

Now, considering an electron-beam originating in point 1 of Fig. 1 and propagating along the line $d$ to point 2, under the condition that the electrons producing and leading electrode-system be performed in such kind that the beam-electrons during their free flight from 1 to 2 are not subjugated to a field-variation by the electrodes rotating with the body, these beam-electrons get in their point of origin 1, in consequence of the body's rotation, perpendicular to their propagation-direction, the tangential-velocity $v_1$. This tangential-velocity $v_1$ the electrons retain up to their point of arrival 2 in Fig. 1. As the electrode, struck by the electron-beam in point 2, is in firm connection with the body and moves with the tangential-velocity $v_2$ during the flight-time of the electrons on their way from point 1 to point 2 in Fig. 1, the flight-path of the electrons propagating perpendicular to the body's axis seems to have a deviation from the bee-line or normal path propagation. With a flight-time $t^{(sec.)}$ of the electrons between the points 1 and 2 in Fig. 1, this deviation amounts to:

$$s = (\Delta v \cdot t) \, (cm.)$$

On the other hand, no deviation of the described type appears if the flight-path of the electron-beam is parallel directed to the body's axis.

This invention now describes a device ascertaining a direction perpendicular and/or parallel to the axis of the body by the deviation from the bee-line propagation, in dependence of the site of the electron-flight-path in respect to the earth-axis.

Thus, an acceleration indicating system would have the general form shown in Fig. 2, where G is an electron gun comprising a source of electrons and proper accelerating and beam focusing electrodes, $d$ is the path of electrons travel through which these electrons travel without being subjected to any deflecting fields. If the system shown in Fig. 2 is arranged in a plane perpendicular to the axis of the body in such a manner that the normal path if extended intersects that axis, then, according to the principle of the invention indicated above, the path, along which the electrons would travel, would include a small angle with that path $d$, which would be followed by the electrons, when the direction of $d$ would be parallel to the axis of the body. As indicated above the electrons under the first condition would impinge at the surface of a unit, marked I, at a slightly different point compared with the point of impact under the second condition. The unit I which may be named "deflection intensifier" greatly magnifies the small deflection angle. Several possible arrangements suitable to accomplish such a deflection magnification will be described later. The electrons leaving the unit I include a greatly magnified angle with the axis of the tube or the normal path and impinge upon a second unit II, which may be named a "deflection indicator" or "deviation indicator." This unit although it may assume any form suitable to indicate any deviation of the point of impact of an electron beam should preferably be any of several arrangements to be described later.

The principle of a device indicating very small deviations of an electron-beam from the bee-line shown in Fig. 3. The electron-beam E, of which a direction-deviation is to be indicated, gets, by an electrode-system in its origin, a rectangular intensity-modulation (periodic beam interruption). This intensity-modulation may be one with the frequency $\Omega$. This modulation of the beam may be of such a type that through half a cycle of the oscillation with frequency $\Omega$ the beam has full intensity and that through the second half of the oscillation-cycle the beam is suppressed. A sinusoidal oscillation of the same frequency $\Omega$ now excites the deflection-field of the condenser $C_1$. In the undeviated condition the beam E passes the condenser $C_1$ on its middle-line. The phase-relation between the beam intensity-modulation and the oscillation exciting the condenser $C_1$ may be so as represented in Figs. 3b and 3c. By the deflection-oscillation on $C_1$, the beam E is spread open to the amount A on the screen B. Through the aperture of this screen, the diameter of this aperture being $a$, a short pulse of the original beam E passes and travels, as the aperture in B is exactly located in the middle-line of the condensers $C_1$ and $C_2$, along this line into the deflection-field of the condenser $C_2$. The deflection field of this condenser is excited by an oscillation with the frequency $\omega = m \cdot \Omega$. This means that $\omega$ is a multiple of the frequency $\Omega$ exciting the deflection-field of the condenser $C_1$. The respective phases of the oscillations with frequencies $\Omega$ and $\omega$ are mutually related in such a manner that, with appropriate regard of the flight-time of the electrons between the condensers $C_1$ and $C_2$, those electrons of the beam E which pass the condenser $C_1$ during the zero-passage of the deflection-oscillation of $C_1$ also pass the condenser $C_2$ during a zero-passage of its deflection-oscillation.

Fig. 3d represents the deflection-voltage of $C_2$ for a value $m=2$, only as a sample.

In the normal case, i. e. in the case of an undeviated electron-beam E entering the condenser $C_1$, the short pulse passing the aperture of the screen B will pass the condenser $C_2$ undeflected. But if the beam E is deviated from its normal pass before it enters the condenser $C_1$, the spreading of the beam on the screen, B will be respectively shifted. Fig. 3a shows this shift amounting to $s_1$. The pulse out of the spread beam which passes now the opening in B consists of electrons of the beam E which did not longer pass the condenser $C_1$ during a zero-passage of the deflection oscillation (frequency $\Omega$) but which passed the condenser $C_1$ during a condition of the phase of the deflection-oscillation which may be determined by a phase-angle $\phi$ of the oscillation with the frequency $\Omega$. This phase-angle $\phi$ directly corresponds to the aforementioned deviating $s_1$. As the deflection oscillation exciting the condenser $C_2$ with a frequency $\omega$ which is the $m$-fold frequency of the deflection oscillation exciting the condenser $C_1$, the electron pulse passing the opening of the screen B now enters the condenser $C_2$ when the deflection-oscillation of this condenser has the phase-condition $m \cdot \phi$. This is shown by a number of dotted vertical lines at the right-hand end of Figs. 3b, 3c, 3d, indicating that a deviation $s_1$ results in a pulse passing the opening in screen B at a phase angle 1 instead at a phase angle zero, corresponding to an unshifted beam. Since the frequency $\omega$ is $m$ times higher compared with the frequency $\Omega$, the wave of Fig. 3d has a voltage $m$ times higher compared with the wave of Fig. 3c exciting the condenser $C_1$. Therefore, the electron-pulse passing the condenser $C_2$ is deflected in this condenser and impinges an indicator system, later on described, with a deviation $s_2$. By appropriately proportioning this device, this new deviation is to be fixed at a reasonable rate with $s_2 = m s_1$. Taken as an example $$\Omega = \frac{1}{2} \cdot 10^2 \frac{\text{cycles}}{\text{sec.}}$$

and $$\omega = 10^9 \frac{\text{cycles}}{\text{sec.}}$$

$m = 2 \cdot 10^7$ results and the deviation $s_2$ is $2 \cdot 10^7$-fold greater than the original deviation $s_1$.

In Fig. 3, the electron-beam-pulse E leaves the deflection-condenser $C_1$ and falls on a bridge-device prepared to indicate the deviation of the beam. As an example, Fig. 4 represents this bridge-device. The electrode L, struck by the electrons, is arranged as a bridge-conductor. In front of L the diaphragm M is aranged. As Fig. 4 shows, the diaphragm M has a statical voltage against the electrode L. This voltage has such a direction that M gets a negative potential in respect to L. The voltage has such a magnitude that the secondary electrons originating on L by the impact of the beam E return to electrode L. By this arrangement, the whole electron-beam-pulse is available for measurement of the beam deviation. Now the device K indicates the impact-deviation of the beam-pulse E from the middle of the electrode L.

As Fig. 4 shows, the electrode L is a part of a bridge of which the impedances $R_1$ and $R_2$ are two balancing resistors. In the undeviated condition of the beam E, the interrupted beam current produces the same voltages along the resistors $R_1$ and $R_2$. These voltages are equally, but in opposite direction amplified and combined along the impedance $R_3$. This means that along $R_3$ the two voltages suppress each other so long as the fundamental bridge is balanced. But a valtage-difference exists along $R_3$ when the bridge is out of balance by a deviated impact of the beam E on the electrode L. The sensitiveness of this deviation-indication depends on the ratio of the absolute values of the currents in the balanced bridge-paths to the value of changement of these bridge-currents caused by the deviation of the point of impact of E. The sensitiveness of the deviation-indication can be improved by suppression of the currents in the balanced bridge.

Following, a performance of a deviation-indication device is described which suppresses the current appearing with an undeviated impact of the electron-beam-pulse. For this performance it is necessary that the electron-beam-pulse, of which the deviation is to be indicated, has a well defined diameter. With a performance of the whole metering device, presented in Fig. 3a, such definition of the pulse diameter is not yet to accomplish, as even if the ratio of the spreading $A$ on the diaphragm $B$ to the aperture $a$ of this diaphragm is chosen very great (for instance $A=10$ cm. and $a=0.1$ mm., $$\frac{A}{a}=\frac{100}{0.1}=10^3)$$

a frequency multiplication-factor $$m=\frac{\omega}{\Omega}=2 \cdot 10^7$$

means that the electron-pulse passing the aperture $a$ of the diaphragm has a duration of several cycles of the oscillation with the frequency $\omega$ which excites the condenser $C_2$. Therefore, this electron pulse is spread to a line on the electrode $L$ of the indication device. The deflection of the charge-center of this line, caused by the beam-deviation from the original beam's bee-line, was to be indicated by the aforementioned bridge-device.

To produce an electron-pulse with well defined diameter in a device built up on the principle of the aforedescribed performance, one has to switch from the representation of Fig. 3a to the performance presented in Fig. 5. In this Fig. 5 the frequency multiplication of the deflection oscillation is not longer accomplished in one stage but in two stages and could be accomplished even with a greater number of stages. But the principle of the device according to Fig. 5 is just the same as that of Fig. 3a.

The electron-beam $E$ of which the deviation of the flight-path from the bee-line is to be indicated is spread by the oscillation $\Omega$ exciting the condenser $C_1$. The electron-pulse passing the opening of the diaphragm behind $C_1$ is newly spread by the oscillations $\omega_1=m \cdot \Omega$ exciting the condenser $C_2$. Already with such an arrangement it is possible to choose the appropriate ratios between pulse-spreading and opening of the diaphragm that the electron pulse leaving the opening of the diaphragm behind $C_2$ has so short a duration that it covers only a small portion of one cycle of the deflection oscillation $\omega_2=n \cdot \omega_1=m \cdot n \cdot \Omega$ which excites the deflection-condenser $C_3$.

For instance, the amplitude of the deflection oscillation $\omega_2$, exciting condenser $C_3$, may have a value that in the plane of an impact-electrode of the deviation indicating device a total spreading of 10 mm. can occur. In consequence of this example, the ratio between the beam-spreadings to the following diaphragma-openings of the condensers $C_1$ and $C_2$ be so arranged that the electron pulse entering the deflection condenser $C_3$ covers about $\frac{1}{20}$ of one cycle of the oscillation $\omega_2$ exciting the condenser $C_3$. The diameter of the electron pulse impinging the electrode of impact of the deviation-indicating-device now may well be defined with a value of 1 mm. For the case of an undeviated electron-beam $E$, the phase-relations of the deflection oscillations $\Omega$, $\omega_1$ and $\omega_2$ are (under consideration of the speed of the beam-electrons) fixed in such a manner that the beam entering condenser $C_1$ causes an electron-pulse leaving condenser $C_3$ in the direction of the continued middle-line of the condensers $C_1$, $C_2$, $C_3$. Now, an electron-beam $E$ deviated from the bee-line flight-path entering the condenser $C_1$, the electron-pulse leaving the condenser $C_3$, at least possesses a deviation from the middle-line of the three condensers magnified with the ratio of the frequency multiplication of the deflection-oscillations.

Now, Fig. 5 shows the impact-electrode $L$ which has such dimensions that the impinging undeviated electron-beam-pulse be completely incepted. Fig. 5 represents before the electrode $L$ a diaphragm $M$ with a negative potential against $L$. This potential has such a value that the secondary electrons emitted by the impact of pulse electrons fall back on the electrode $L$. Now, if the electron-beam-pulse leaving $C_3$ is deflected from the normal flight-path according to an original deviation of the beam $E$ from the normal flight-path, a portion of the electron-pulse passes the electrode $L$. The amount of this portion of electrons passing the electrode $L$ represents a measure for the deflection of the electron-pulse leaving $C_3$ and, according to the aforedescribed relations, it is a measure for the deviation of the beam $E$ from the bee-line propagation of this beam.

As the electron current passing the electrode $L$ has only a very small amount, this current is to be amplified by an electron-multiplier as represented in Fig. 5. Fig. 5 presents this multiplier as a grid multiplier with the grids $G_1$, $G_2$ and $G_3$. This multiplier, of course, may be of another type and may be constructed with any number of stages. The electron-current striking the electrode $K$ in Fig. 5 now is amplified to an amount that the current can easily be measured.

The value of the electron-current indicating the beam deflection follows out of the several values of the afore-computed example:

The electron-pulse which enters the deflection condenser $C_3$ ought to have a duration of $\frac{1}{20}$ of one cycle of the oscillation $\omega_2$. With $\omega_2=10^9$ cycles per sec. this means that the electron-pulse passing the electrode $L$ has a duration of $$\tau=\frac{1}{2} \cdot 10^{-10} \text{ sec.}$$

The intensity of the electron-beam $E$ may be fixed with $10^{-4}$ amps. With this value a satisfying electro-optical concentration of the beam can yet be reached. The electron pulse with the charge of $\frac{1}{2} \cdot 10^{-14}$ amp. sec. striking the electrode $L$ has a well defined diameter of 1 mm. This value also determines the diameter of the electrode $L$. As an example, a pulse-deflection of $10^{-2}$ mm. causes a portion of the electron-pulse with a charge of $$\frac{1}{2} \cdot 10^{-14} \cdot 10^{-2}=\frac{1}{2} \cdot 10^{-16} \text{ amp. sec.}$$

to pass the electrode $L$ and to enter the electron-multiplier which amplifies this pulse to a measurable current. The value of $\frac{1}{2} \cdot 10^{-16}$ amp. sec. means the number of about 300 electrons. As well known, an electron-pulse with such a number of electrons can easily be indicated by an electron-multiplier.

But a further increase of sensitiveness of the whole device can be reached by an additional device magnifying the deviation from the bee-line propagation of the electron-beam. Fig. 6 represents such an additional electrical device in principle:

The electron-beam $E$ is deflected by a cylindrical condenser consisting of the two electrodes $Z_1$ and $Z_2$. The gradient of the electrical field between the two electrodes determines the beam-deflection. As is well known, this gradient grows with approach to the electrode with the smaller curve radius. With an appropriate choice of the radius of the two electrodes this growing of the field-gradient can be of such a value that an electron-beam $E$ once entering the device designed in Fig. 6 along the line 1 and in a second case along the line 2, i. e. with an angle-deviation $\alpha_1$, leaves the condenser with an angle-deviation $\alpha_2$ between the two paths. By means of this device a 100-fold increase of the direction deviation of the beam may be reached.

This magnifier for the deviation from the bee-line flight-path may either be arranged in the path of the electron-beam before the already described deviation magnifier or in front of the electrode $L$ in Fig. 5.

With such completed device it is possible and can be reached that the electron-pulse originally wholly striking the electrode L now completely passes this electrode L when the accelerated movement deviates the electron-beam E from its bee-line propagation. The number of electrons of the electron-pulse, so entering the electron multiplier, increases in the case of maximum deflection to about 30,000 electrons. No doubt, such an electron pulse can be multiplied to a well measurable current.

This 30,000-electrons-pulse corresponds to an angle-rotation of 90° of the whole indicating device against the axis of the earlier mentioned rotating body.

Until now, the device has been considered with electron-beams passing the system. Of course, all considerations of this description are to transfer to a system working with an ion-beam. In this case the deviation of the ion-beam from the bee-line propagation, caused by the accelerated movement, increases with the square root of the ratio of the ion-mass to the electron-mass. As this root ratio has not less a value than 40 to 50, the deviation indication correspondingly simplifies.

Fig. 7 is a scheme of the whole device. The cathode D, for instance, emits electrons. The electrode W modulates the intensity of the beam in the aforedescribed manner. The electrode F being provided with an apertured diaphragm accelerates the beam. A concentration device for the beam, which is not especially represented in Fig. 7, may consist of well known electric or magnetic lenses. The beam concentration can also be preferably performed by a low pressure gas filling of the bulb. As well known, such gas-concentration makes it possible to produce a beam E with a diameter of only a part of one millimeter. Provided the edges of the diaphragm F are sufficiently hard, the beam E is well defined in its cross-section. After passing the distance $d$ the electron beam of the aforedescribed device reaches the indicator for the beam-deviation from the bee-line flight-path. This deviation indicator indicates only the component of the deviation from bee-line propagation which occurs in the presentation plane of Fig. 7. The fact, that only this component of the deviation is indicated by the device, later in this description will lead to an especial useful performance of the invention.

The performance of the invention described until now consists of two spaces or areas, in the first of which the beam is deviated from the geometrical bee-line propagation in correspondence with the accelerated movement while in the second space or area, the indication of this deviation from the bee-line propagation takes place. In this performance the difficulties of apparatus are located in the second space, that means the deviation indicator is the most difficult part of the whole device.

Now, it is also possible to perform the invention in such a manner that the deviation from normal propagation, in correspondence with the acceleration of any accelerated movement, becomes so enlarged that the indication of this deviation does not longer mean any great display. To get this result it is necessary to prolong the flight-time of the beam-particles (for instance electrons) so that a greater deviation of the beam-flight-path from the normal path occurs according to the rotating or other accelerated movement. In this respect an ordinary extension or elongation of the flight-path considered until now does not solve the problem, as the whole device would become too large. But, as for instance Fig. 8 in principle represents, it is possible with magnetic means substantially to increase the flight-time through which the flight-path deviation occurs.

As shown in Figs. 8a and 8b, it is the principle of enlarging the flight-path and the flight-time of the beam-particles, to move these particles on a spiral. As well known it is possible to induce such movement of charged particles on a spiral by means of a magnetic field. The beam particles (for instance electrons) originate at the electrode $e_1$ and leave this electrode as a well defined beam as is to be seen in Fig. 8b, which shows a cross-section of Fig. 8a along the line A—A. By means of an electric field the particles are accelerated in the direction to the electrode $e_2$. The whole space through which the electrons are passing is filled with a magnetic field which Fig. 8a represents between the pole-shoes N and S of an electro-magnet. The flight-path of the charged particles between the electrode $e_1$ and $e_2$ is wound up to a spiral and the flight-path and the flight-time of the particles is manifold enlarged compared with the bee-line path and flight-time between the two electrodes.

With the already described means of the deviation indication this deviation from a normal flight-path of the charged particles easily can be indicated. It can be supposed that the frequency ratio of the deflection oscillations in the described deviation indicator now can be decreased with 2 orders.

Just as similarly increased flight-time of the charged particles of the beam can be accomplished by electrical means.

In Figs. 9a and 9b three complete devices $x_1$, $x_2$, $x_3$, as described as performance of this invention, are combined in the three-legged arrangement of Fig. 9a. The construction defines the plane P. All three devices are so arranged that the earlier mentioned acceleration-component, which they are enabled to indicate, is for all three devices parallel orientated, and orientated in the (W—O) direction of the rotation. The direction $y$ may be a perpendicular direction to the earth-axis. As easily to understand, with this orientation of the whole combined arrangement, according to the body's rotation each device $x_1$, $x_2$, $x_3$ indicates a well defined beam-deviation from the normal (bee-line) propagation. An inclination or slope of the plane $p$, respectively the direction $y$, towards the perpendicular direction to the axis produces alterations of the beam deviations and, respectively, alterations of the indicated currents of the three devices $x_1$, $x_2$, $x_3$. These alterations of the indicator currents, in a well known manner, are to be used to control the position in the space of the combined arrangement so that the plane P, respectively the direction $y$, are turned back in the predetermined position to the body's axis.

As earlier described, only one acceleration-component is indicated by the described performance of the invention. Now, if the plane P rotates around the axis $y$, this means a uniform decrease of the beam deviations, respectively a uniform decrease of the indicator currents in all three devices $x_1$, $x_2$, $x_3$, as these devices then are turned out of the W—O rotation direction of the earth. This uniform decrease of the three indicator currents is a criterion sufficient to turn back, with well known means of control, the plane P around the axis $y$ into the W—O direction in which the largest beam-deviation occurs.

Only in the case, that an additional movement of the combined arrangement turns the whole three-legged device around the combination point of the three legs in the W—O direction, that means a movement just influencing all three devices in the opposite sense of the rotation, the same uniform decrease of the three indicator currents occurs which already has been used to control the plane-position in the case of a rotation around the $y$-axis. Therefore an additional acceleration indicating system as described in this invention, has to be added to the combined arrangement. This additional system preferably is to be orientated parallel to the body's-axis and separately indicates a rotation of the combined device around the $y$-axis.

Fig. 9b represents how the plane P is orientated in respect to the earth-axis on the surface of the globe if the rotating body under consideration is the earth.

In this case, the combined arrangement with devices as described as performance of this invention unequivocally fixes the plane P in respect to the earth-axis and simultaneously fixes the West-East direction (earth-rotation-direction).

As evident, the described performance of the invention is an acceleration meter, or a device for measuring the angle-velocity of a rotation. In each case the acceleration of a movement in the horizontal direction of the plane of Fig. 7 is indicated.

This acceleration metering is free from all the disturbances being unavoidable in any mechanical acceleration-meter. Rather, the described electrical acceleration-metering has an exactness of measurement only dependent of the value of electric voltages which easily can be fixed between very narrow limits. Therefore, within these limits, the measurement exactness is independent of time.

Having now particularly described and ascertained the nature of my invention and in what manner the same is to be performed, I declare that what I claim is:

1. In a cathode ray indicating system, an evacuated tube, means within said tube for producing and directing electrically charged particles from a predetermined point of origin along a free flight path to another point to produce a flight path deviation corresponding to the acceleration of the movement of said tube, a deflection condenser arranged along said deviation flight path and means for exciting said condenser with a predetermined frequency for spreading the beam along said flight path, the tube having a diaphragm with a small opening for receiving said spreaded beam, and a second deflection condenser and means for exciting said second condenser with an oscillation of a frequency which is a multiple of said predetermined frequency whereby the beam portion passing said opening is subjected to a flight path deflection proportionally magnified at the ratio of the deflection frequencies, means for receiving deflected and undeflected particles at said point of reception, and means within said same tube for comparing deflected and undeflected beam portions.

2. System according to claim 1 comprising several stages of deflection condensers and associated diaphragms arranged behind each other along said deviation flight path, the frequencies of the deflection oscillations being increased from stage to stage at multiple ratios.

3. In a cathode ray indicating system, a number of flight path producing systems arranged at an angle with respect to each other to form a unitary structure; each of said flight path producing systems operating in vacuum for producing and directing electrically charged particles from a predetermined point of origin along a free flight path to another point to produce a flight path deviation corresponding to the acceleration of the movement of said structure and each of said flight path producing systems being associated with at least one flight path deflection means for deflecting said particles during their flight time between said points so as to shift said flight path substantially without field influence causing to deviate said particles, in direction parallel and opposite to acceleration, at least on flight path output means for receiving deflected and undeflected particles at said point of reception, and means within said vacuum for comparing deflected and undeflected beam portions; and means for comparing the outputs of the different flight paths to indicate the direction of the movement of said structure.

4. System according to claim 3 comprising several unitary structures, each comprising a number of flight path producing systems each associated with at least one flight path deflection and flight path output means, said systems being arranged at an angle with respect to each other to form said unitary structures and means for orientating in space a movement common to said unitary structures in the direction of maximum acceleration of said movement.

References Cited in the file of this patent
UNITED STATES PATENTS

| Number | Name | Date |
| --- | --- | --- |
| 2,103,507 | Zworykin | Dec. 28, 1937 |
| 2,114,283 | Anderson | Apr. 19, 1938 |
| 2,211,614 | Bowie | Aug. 13, 1940 |
| 2,239,407 | Wagner | Apr. 22, 1941 |
| 2,242,888 | Hollmann | May 20, 1941 |
| 2,263,376 | Blumlein et al. | Nov. 18, 1941 |
| 2,356,510 | Deserno | Aug. 22, 1944 |
| 2,441,269 | Hartig | May 11, 1948 |
| 2,455,394 | Webber | Dec. 7, 1948 |
| 2,457,620 | Abraham | Dec. 28, 1948 |
| 2,587,481 | Kaehni et al. | Feb. 26, 1952 |